United States Patent [19]
Pfeiffer et al.

[11] Patent Number: 4,594,584
[45] Date of Patent: Jun. 10, 1986

[54] DEVICE FOR DETERMINING AND/OR MONITORING A PREDETERMINED FILLING LEVEL IN A CONTAINER

[75] Inventors: Helmut Pfeiffer, Lörrach; Volker Dreyer, Lörrach-Haagen; Martin Pfändler, Steinen, all of Fed. Rep. of Germany

[73] Assignee: Endress u. Hauser GmbH u. Co., Fed. Rep. of Germany

[21] Appl. No.: 656,367

[22] Filed: Oct. 1, 1984

[30] Foreign Application Priority Data

Oct. 11, 1983 [DE] Fed. Rep. of Germany ....... 3336991

[51] Int. Cl.⁴ .................................................. G08B 21/00
[52] U.S. Cl. .................................. 340/620; 73/290 V; 310/323; 310/328; 340/618; 340/621
[58] Field of Search ............... 340/612, 615, 617, 618, 340/620, 621; 200/61.2, 61.21; 73/651, 290 V; 310/317, 321, 331, 323, 328

[56] References Cited

U.S. PATENT DOCUMENTS

| 3,336,529 | 8/1967 | Tygart | 310/323 X |
|---|---|---|---|
| 3,598,506 | 8/1971 | O'Neill | 310/328 X |
| 3,614,486 | 10/1971 | Smiley | 310/323 |
| 3,625,058 | 12/1971 | Endress et al. | 73/290 V |
| 3,666,975 | 5/1972 | Balamuth | 310/323 |
| 3,702,948 | 11/1972 | Balamuth | 310/323 |
| 3,903,435 | 9/1975 | Bouygues | 310/328 |
| 3,944,994 | 3/1976 | Fanshawe | 340/621 X |
| 4,219,755 | 8/1980 | O'Neill et al. | 310/328 |
| 4,491,759 | 1/1985 | Kunz et al. | 310/328 |

Primary Examiner—James L. Rowland
Assistant Examiner—Daniel Myer
Attorney, Agent, or Firm—Barnes & Thornburg

[57] ABSTRACT

The device for determining and/or monitoring a predetermined filling level in a container has two oscillatory rods secured with spacing adjacent one another on a diaphragm the edge of which is connected to a screw-in part. By means of the screw-in part the device is so secured in a screw-threaded aperture of the container wall at the height of the filling level to be detected that the oscillatory rods project into the container. At the side of the diaphragm remote from the oscillatory rods a bridging member is held spaced from the diaphragm by flexurally elastic rod-shaped supports. Each of the rod shaped supports is rigidly connected at one end to an oscillatory rod. Between the bridging member and the diaphragm there is held, with preloading of the diaphragm, a transducer column comprising in a stack a piezoelectric excitation transducer and a piezoelectric reception transducer. The piezoelectric transducers are connected to one another via an amplifier in a self-excitation circuit so that the mechanical oscillatory system is excited with its natural resonance frequency. An evaluation circuit responds to changes in frequency of the oscillations and initiates indicating and/or switching operations in accordance with such frequency changes.

20 Claims, 12 Drawing Figures

DEVICE FOR DETERMINING AND/OR MONITORING A PREDETERMINED FILLING LEVEL IN A CONTAINER

The invention relates to a device for determining and/or monitoring a predetermined filling level in a container, with a mechanical oscillatory structure comprising two oscillatory rods which project into the container and which are secured at a spacing from one another to a diaphragm held at its edge region, an excitation arrangement imparting to the oscillatory rods oscillations in opposite directions transversely to the longitudinal direction of the said rods, and comprising an excitation transducer with at least one piezoelectric element excitable by an AC voltage, with a reception transducer having at least one piezoelectric element converting the oscillations of the mechanical oscillatory structure into an electrical output signal, and with an evaluation circuit for initiating display and/or switching operations in accordance with the output signal of the reception transducer.

A device of this kind is known from U.S. Pat. No. 3,625,058. As compared with other known devices having a single oscillatory rod projecting into the container it affords the advantage that the alternating forces exerted by each oscillatory rod on the means holding the diaphragm cancel each other out owing to the oscillations being in opposite directions, so that no oscillation energy is lost by transmission to the container wall, and the holding means are also subjected to less mechanical load. In this known device those ends of the oscillatory rods which are connected to the diaphragm are connected to one another by two bridging members which are mechanically decoupled from one another and each of which comprises a yoke resting on the diaphragm and a stirrup spanning the yoke. One bridging member is coupled to the excitation transducer and the other to the reception transducer in that the piezoelectric element of the transducer is held between the stirrup and the yoke. The excitation transducer is connected to the output of an amplifier whose input is connected with the reception transducer, so that there is self-excitation of oscillations at the natural resonance frequency of the mechanical oscillatory structure. The evaluation circuit connected to the output of the amplifier is so constructed that it responds to amplitude changes. The method of operation of this device is based on the fact that the mechanical oscillations of the oscillatory rods are damped on penetration into the filling, so that a reduction in oscillation amplitude takes place which is detected by the evaluation circuit and causes the initiation of a display and/or switching operation.

It has been found that because of the construction of the mechanical oscillatory structure and the arrangement of the piezoelectric transducers this known device is conditional on the oscillatory rods being damped to a relatively considerable extent by the filling, to ensure reliable response to amplitude changes. Therefore this device can be used only for monitoring fillings which cause considerable damping when they cover the oscillatory rods, such as bulk materials or liquids of high viscosity. To obtain an adequate oscillation amplitude a high AC voltage is needed for excitation, usually of the order of magnitude of mains AC voltage of 220 V, and the excitation energy to be applied is also considerable. The high excitation AC voltage makes it difficult to use the device in regions where there are explosion risks.

In devices for monitoring filling level which have a single oscillatory rod it is also known to use, not amplitude changes, but changes in natural resonance frequency on penetration of the oscillatory rod into the filling for initiating the display and/or switching operations.

The invention has as its object so to construct a device of the kind indicated initially using two oscillatory rods projecting into the container that it is suitable for fillings of all kinds, with a low excitation AC voltage and low excitation energy in operation, and has good intrinsic safety.

According to the invention this is achieved in that at that side of the diaphragm which is remote from the oscillatory rods a bridging member is held at a spacing from the diaphragm by flexurally elastic rod-shaped supports each connected rigidly at one end to an oscillatory rod, and that the piezoelectric elements of the excitation transducer and of the reception transducer are arranged in a stack which is held, with preloading of the diaphragm, between the bridging member and the portion of the diaphragm situated between the oscillatory rods.

The construction of the mechanical oscillatory structure proposed according to the invention results in a considerable step-up effect between the excitation transducer and the mechanical oscillatory structure, so that the deformation of the piezoelectric elements which is necessary for obtaining an adequate oscillation amplitude is very small. Moreover already at very slight changes in the entrained mass this construction results in a marked modification of the natural resonance frequency before any noticeable damping of the oscillation amplitude begins. This marked change in the natural resonance frequency occurs even with very small oscillation amplitudes of the oscillatory rods. Therefore, if the evaluation circuit is constructed so that it responds not to amplitude variations but to frequency variations, great sensitivity and response reliability are achieved even with very small oscillation amplitudes at the oscillatory rods. Therefore, a relatively small AC voltage is sufficient for actuating the excitation transducer, which voltage may be for example of the order of magnitude of 10 V. Owing to the low actuation voltage the device is particularly suitable for use in explosion-endangered places. Because of the low actuation voltage and the small oscillation amplitude the power required for actuation is also small, so that the construction of the electronic circuits is made simpler and cheaper.

A particular advantage of the construction of the device according to the invention consists in that even very small changes in the entrained mass are sufficient to produce a detectable frequency variation. Therefore, the device already responds to very small differences in the density of the ambient medium. As a result it is possible to detect and monitor filling levels of container fillings of very low density, or transitions between two fillings having very small density differences. Moreover the response point can be adjusted with great precision. Thus for example it is possible to detect the transition from air to a foam or between a foam and a liquid.

It has also been found that the changes in natural resonance frequency, more particularly in the case of very small oscillation amplitudes, are substantially independent of the viscosity of the filling. Independence from viscosity is a very desirable property since with many fillings the viscosity of the filling can vary within wide limits, for example in dependence on temperature fluctuations, and of course it is not admissible that the device should erroneously indicate a change in filling level when viscosity changes occur.

The small oscillation amplitudes with which the device according to the invention can be operated also afford the advantage that none of the component parts are subjected to much mechanical stress, which greatly simplifies and reduces the cost of construction.

Finally, evaluating frequency variations instead of amplitude variations gives greater intrinsic reliability or security to the device, since oscillations occur in all working states and differ merely by their frequency. Therefore, cessation of oscillations indicates failure of the device.

Since the device according to the invention responds very quickly to slight variations in the density of the entrained mass, a preferred feature consists in that the evaluation circuit comprises a response delay circuit which allows initiation of a display and/or switching operation only when the frequency has been detected as having been above or below the reference frequency during a predetermined number of periods.

This obviates responding to sporadic density variations, such as are caused for example by air or gas bubbles which form briefly in gas-producing liquids round about the oscillatory rods, or by air bubbles blown artificially into the container such as happens in many fields of application.

Advantageous features and further developments of the invention are characterized in the subordinate claims.

Further advantages and features of the invention are shown in the following description of an example of embodiment shown in the drawings. In the drawings.

Figure 1:
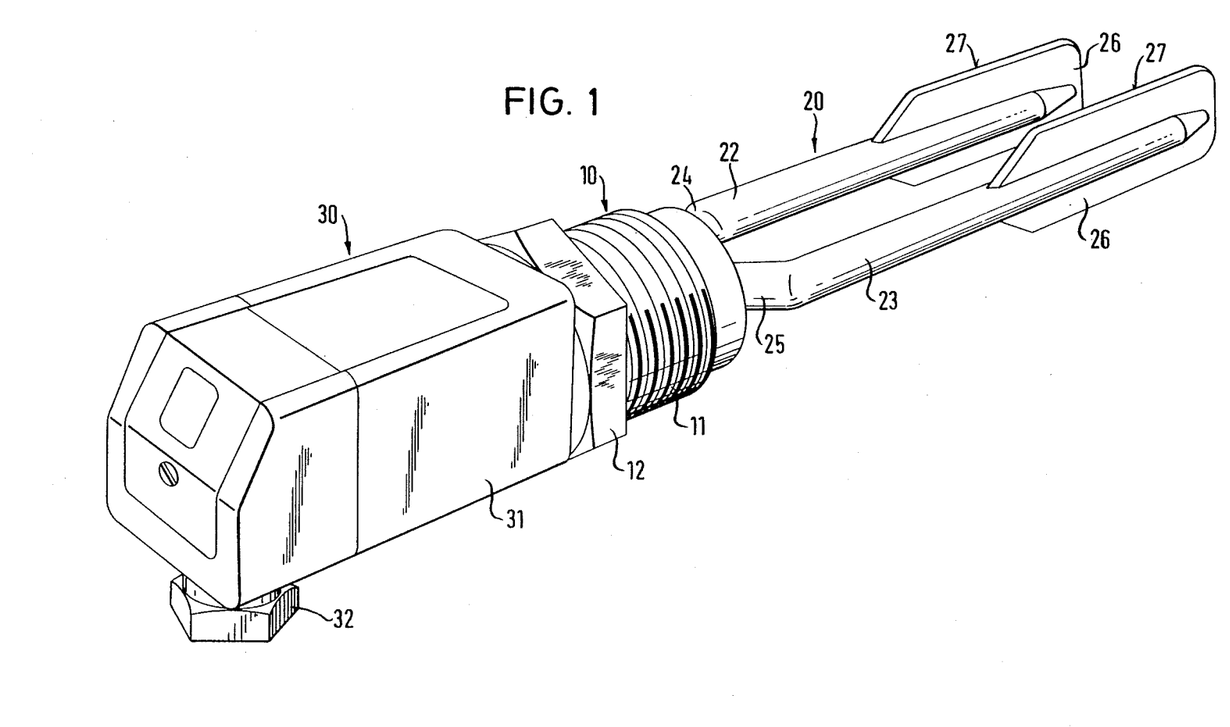
FIG. 1 is a perspective view of the device according to the invention in the non-mounted state.
Figure 2:
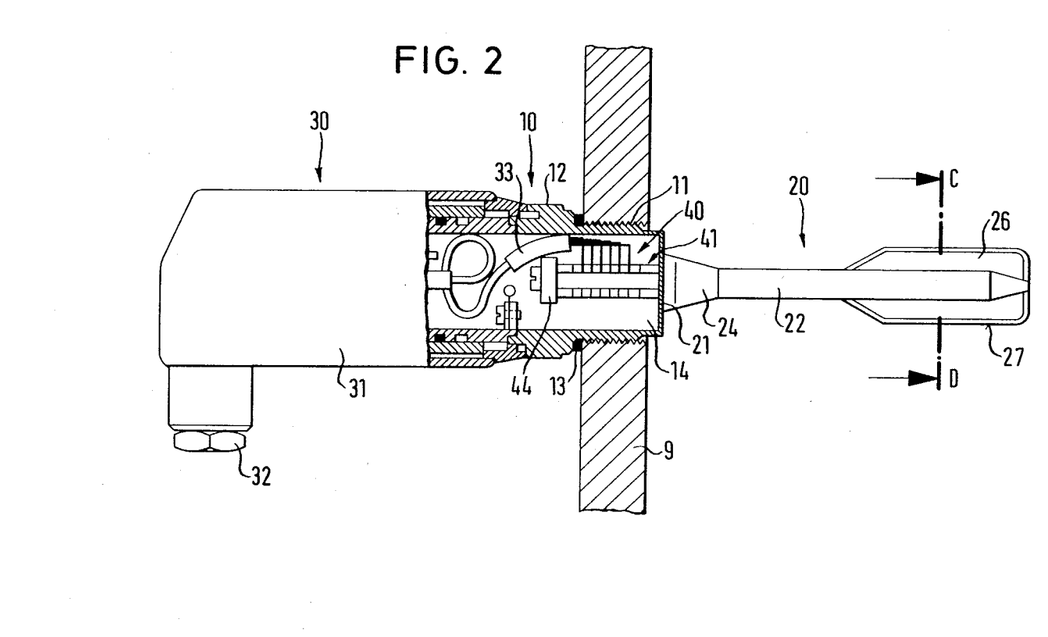
FIG. 2 is a partial longitudinal section through the device mounted in a container wall.

The device shown in perspective in FIG. 1 and in section in FIG. 2 for determining and/or monitoring a predetermined filling level comprises the following principal components:

a screw-in part 10;

an oscillatory rod system 20;
an electronics head 30;
a transducer arrangement 40.

The screw-in part 10 is used for securing the device in the wall of the container the filling level in which is to be monitored with the device. The said part has a screw-threaded portion 11 which is screwed into an aperture in the container wall 9 (FIG. 2) provided with a corresponding internal screwthreading, and a hexagon head 12 on to which a wrench can be engaged with which the screw-in part 10 can be tightened against the container wall 9, with interposition of a sealing ring 13. Usually the device is mounted in a horizontal position on a vertical container wall at the height of the filling level to be monitored, but the device may be mounted in any position; for example it may also be mounted in a vertical position at the top of a container if the filling level to be detected corresponds to the container being completely filled.

The interior 14 of the screw-in part 10 is hollow and is used for accommodating the transducer arrangement 40 as will be discussed in detail hereinafter.

Figure 4:
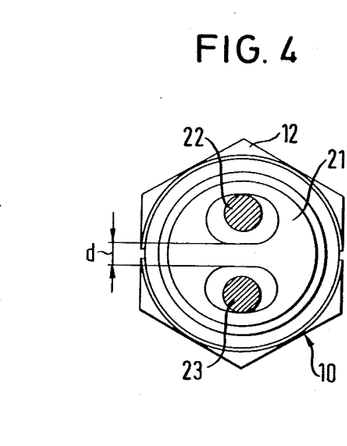
FIG. 4 is a view on to the diaphragm and the screw-in part in section through the oscillatory rods along the section line A-B of FIG. 3.

The oscillatory rod system 20 is supported by the screw-in part 10 at the side directed towards the container interior. It comprises a diaphragm 21 which closes that end of the screw-in part 10 which is directed towards the container interior, and whose edge is securely connected to the screw-in part, and two oscillatory rods 22, 23 which at one end are connected securely to the diaphragm 21, at a spacing adjacent one another, whilst their free ends project into the container. Each oscillatory rod is provided with a cranked or offset portion 24 and 25 respectively so that the main portions of the oscillatory rods, situated substantially parallel adjacent one another, are spaced further from one another than the ends which are connected to diaphragm 21. As a result of the offset portions 24, 25 residues of longitudinal oscillations still transmitted by the diaphragm 21 are also converted into oscillations directed transversely with respect to the oscillatory rods. The main portions of the oscillatory rods have a round cross-section and taper to a point at their free ends. The offset portions 24, 25 widen to form a relatively large non-circular cross-section at the junction zone with the diaphragm 21, as may be seen from the section view in FIG. 4.

On the free end of each oscillatory rod 22, 23 a paddle 26 is arranged at right angles to the plane containing the axes of the oscillatory rods. Each paddle 26 extends from the free end of the oscillatory rod over a relatively considerable length which amounts to between 40 and 60% of the length of the oscillatory rods and is preferably 50% approximately of that length. On the other hand the width of each paddle at right angles to the longitudinal axis of the rod is substantially smaller than the length. This width of the paddles 26, and the offset portions 24, 25, are so adapted to one another that the oscillatory rods 22, 23 with the paddles 26 arranged thereon can be passed through the screwthreaded aperture arranged in the container wall 9. Because of the considerable length of the paddles, a large effective paddle surface is obtained in spite of the relatively small width imposed on the paddles 26 by that necessity.

Figure 5:
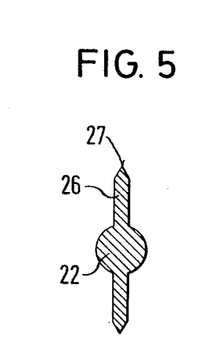
FIG. 5 shows a cross-section on a larger scale through an oscillatory rod along the section line C-D of FIG. 2.

The edge 27 of each paddle is tapered to make a sharp edge all round, as the section view in FIG. 5 shows.

Preferably the screw-in part 10, the diaphragm 21, the oscillatory rods 22, 23 and the paddles 26 are formed as one integral metal piece.

The electronics head 30 is arranged at that end of the screw-in part 10 which is opposite from the oscillatory rod system 20, so that in the mounted state (FIG. 2) it is situated outside the container. It contains the electronic circuit system of the device, this being surrounded by a housing 31. A cable bushing 32 is used for taking-in the cable necessary for current supply and signal transmission. An internal connecting cable 33 connects the electronic circuit system arranged in the housing 31 with the transducer arrangement 40 arranged in the hollow interior 14 of the screw-in part 10.

Figure 3:
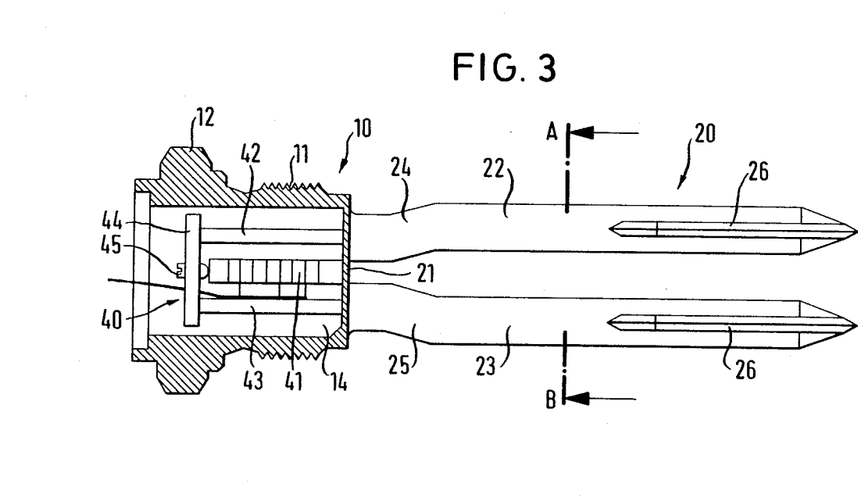
FIG. 3 shows a longitudinal section through the screw-in part with the oscillatory rods and the transducer arrangement, the section plane being at right angles to the section plane of FIG. 2.

As FIG. 3 shows, the transducer arrangement 40 comprises a transducer column 41 which is held between the diaphragm 21 and a bridging member 44 which is held spaced from the diaphragm 21 by rod-shaped supports 42, 43. An adjusting screw 45 screwed into the bridging member 44 bears with its rounded end or through the agency of a rounded intermediate element against that face of the transducer column 41 which is directed towards the bridging member 44, whereby the mechanical preloading of the diaphragm 21 is adjustable with which the transducer column 41 is held between the diaphragm 21 and the bridging member 44.

The end of the rod-shaped support 42 opposite from the bridging member 44 is connected rigidly to the oscillatory rod 22 approximately centrally of the surface region of the diaphragm 21 which is connected to the oscillatory rod 22. In the same way the rod-shaped support 43 is connected approximately centrally of the surface region of the diaphragm 21 connected to the oscillatory rod 23 rigidly to this rod. The two rod-shaped supports 42 and 43 are of flexurally elastic construction so that they can bend elastically transversely to their longitudinal direction.

Figure 6:
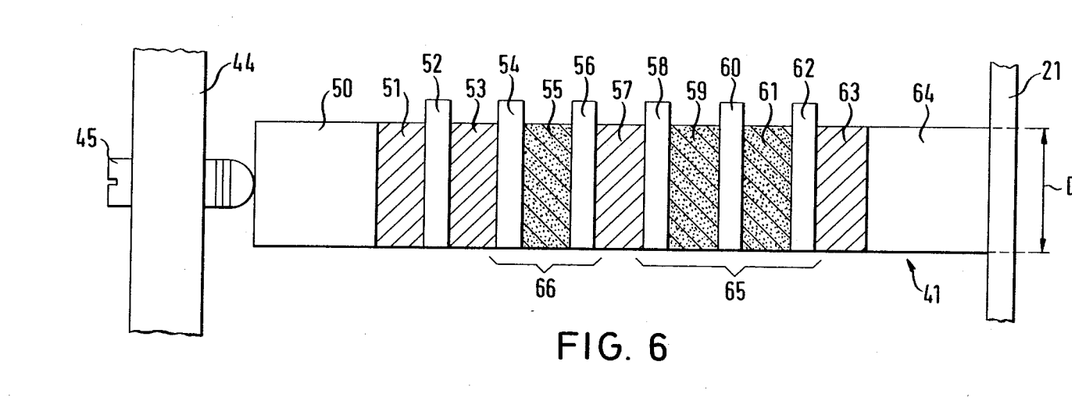
FIG. 6 shows a diagrammatic view of the transducer column.
Figure 7:
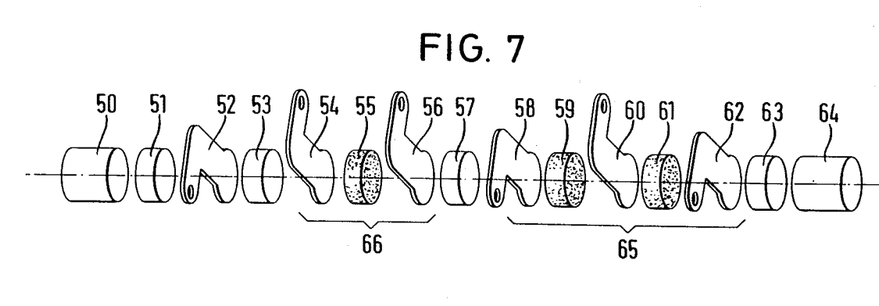
FIG. 7 shows an exploded perspective view of the components of the transducer column.

The construction of the transducer column 41 is shown in a diagrammatic side view in FIG. 6 and in an exploded perspective view in FIG. 7. It comprises a stack consisting of the following components, beginning at the bridging member 44:

a metal plug 50;
an insulating disc 51;
an electrode 52;
an insulating disc 53;
an electrode 54;
a piezoelectric element 55;
an electrode 56;
an insulating disc 57;
an electrode 58;
a piezoelectric element 59;
an electrode 60;
a piezoelectric element 61;
an electrode 62;
an insulating disc 63;
a metal plug 64.

All the components of the stack are of preferably the same cross-section, which in the illustrated example is circular (FIG. 7), so that the transducer column is cylindrical. But a soldering tag is formed on each electrode and projects from the stack. The metal plugs 50 and 64 are made preferably of brass and serve on the one hand as spacer elements for obtaining the requisite length for the transducer column between the diaphragm 21 and the bridging member 44, and on the other hand for transmitting forces to the other components of the stack. More particularly the metal plug 50 has the task of transmitting in parallel manner to the piezoelectric elements 55, 59, 61 the surface pressure produced by the adjusting screw 45, so as to obviate bending of the very fracture-sensitive piezoelectric elements. The metal plug 64 has the effect that the bending movements of the diaphragm 21 emanating from the preloading and from the oscillations are not transmitted to the piezoelectric elements 55, 59, 61; this measure also prevents the readily breakable piezoelectric elements from being subjected to bending stress. Because of using the metal plug 64 moreover there is no need for precise machining of the rear side of the diaphragm 21 such as would otherwise be needed for reducing the danger of fracture of the piezoelectric elements.

The transducer column 41 is so arranged that the face directed towards the diaphragm 21 abuts on that free portion of the diaphragm which is situated between the end faces of the oscillatory rods 22 and 23. This column face is so dimensioned that its diameter D (FIG. 6) is not larger than the spacing d between those ends of the oscillatory rods 22 and 23 (FIG. 4) which are connected to the diaphragm 21; but preferably the diameter D is equal to this spacing d or only slightly smaller. In other words: the face of the metal plug 64 which abuts on the diaphragm 21 is to span as completely as possible the free space between the ends of the oscillatory rods 22 and 23, but not to overlap the end surfaces of the oscillatory rods. In the illustrated example of embodiment the diameter D is equal to the diameter of all the components of the cylindrical stack. However, even where the stack components have larger, smaller, non-circular or non-uniform cross-sections it is always possible to form the metal plug 64 in such a manner that the aforesaid condition is met.

Together with the electrodes 58, 60, 62 the piezoelectric elements 59 and 61 form the excitation transducer 65 the object of which is to convert an alternating-current voltage supplied by the electronic circuit system into mechanical oscillations of the oscillatory rods 22 and 23. The two electrodes 58 and 62 are connected to one pole of the AC voltage source, preferably ground, and the electrode 60 is connected to the other pole of the AC voltage source. The piezoelectric elements 59 and 61 are therefore connected in parallel electrically and in series mechanically. As a result of the applied AC voltage each of the piezoelectric elements 59 and 61 is subjected to deformation (modification in thickness) in the axial direction of the transducer column 41 proportional to the applied voltage. The mechanical deformations of the piezoelectric elements 59 and 61 are added together, so that for a given value of applied AC voltage there is obtained a doubling of the length modification of the transducer column 41.

The piezoelectric element 55 together with the electrodes 54 and 56 forms the reception transducer 66 which has the object of converting the mechanical oscillations of the oscillatory rods system 20 into an electrical output signal which is fed to the electronic circuit system contained in the electronics head 30. The electrode 52 is connected to ground and serves for shielding the reception transducer 66. To shield the reception transducer 66 at the other side, use is made of the fact that the neighbouring electrode 58 of the excitation transducer 65 is connected to ground and thus can be used at the same time as a shielding electrode for protecting the reception transducer. As a result there is no need to provide an additional shielding electrode at this side of the reception transducer.

The way in which the transducer arrangement 40 operates will be explained with the help of the very schematic views in FIGS. 8, 9, and 10. These Figures show in a greatly simplified and exaggerated manner the deformations and position changes of the parts under the action of preload and the AC voltage applied to the excitation transducer. The parts are shown in the condition of rest in FIG. 8. As a result of the preload produced by the adjusting screw 45 the diaphragm 21 is bent outwardly between the supports 42 and 43, so that the oscillatory rods 22 and 23 are swung outwards and the flexurally elastic rod-shaped supports 42 and 43 are bent somewhat inwardly. Thus the preloading force is elastically taken up by the diaphragm 21 and the rod-shaped supports 42 and 43, and the spring action of these parts also compensates for varying amounts of thermal expansion.

Figure 9:
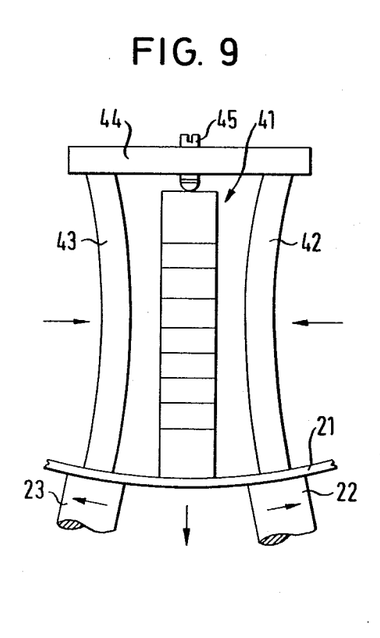
FIG. 9 shows a diagrammatic view of the oscillatory system in a condition during oscillation.

FIG. 9 shows the condition of the parts when as a result of the AC voltage applied to the excitation transducer 55 the length of the transducer column 41 is increased relatively to its length in the condition of rest. The preloaded diaphragm 21 is bent even further outwards, whereby the oscillatory rods 22 and 23 are swung further outwards and the rod-shaped supports 42 and 43 are bent further inwards.

Figure 10:
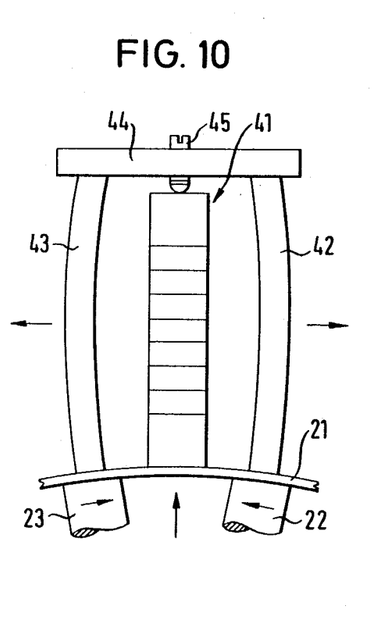
FIG. 10 shows a corresponding diagrammatic view of the oscillatory system in another condition during oscillation.

When on the other hand in the other half period of the AC voltage the length of the transducer column 41 is shortened relatively to its rest-condition length, the oscillatory rods 22 and 23 can swing inwards, whereas the bends in the diaphragm 21 and in the flexurally elastic supports 42 and 43 are first of all unbent and then, in accordance with the particular preset preload, can merge into bends in the opposite direction, as is shown in FIG. 10.

Figure 8:
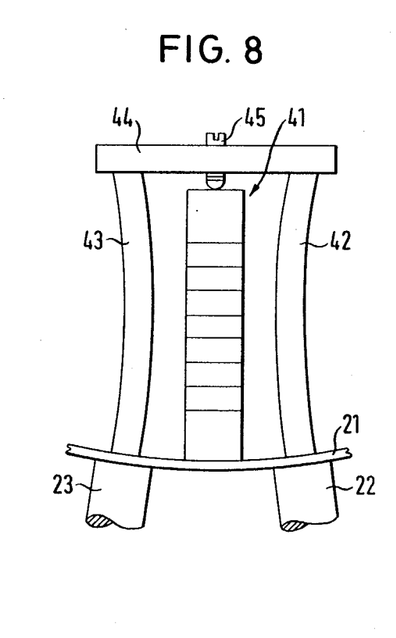
FIG. 8 shows a diagrammatic view of the oscillatory system in the condition of rest.

It should be noted that the deformation amounts shown in FIGS. 8, 9 and 10 are shown in a very exaggerated manner; in reality they are very small, and can be for example of the order of magnitude of a few $\mu m$.

The views in FIGS. 8 and 9 show that due to the action of the excitation transducer in the transducer column 41 the oscillatory rods 22 and 23 are given opposite oscillatory movements transversely to their longitudinal axes in the common plane containing these longitudinal axes. Constructing and dimensioning the parts as illustrated result in a considerable step-up effect, so that the deformation of the piezoelectric elements which is needed for achieving an adequate oscillation amplitude is very small. Owing to the oscillations being in opposite senses, the alternating forces exerted by each oscillatory rod on the holding means of the diaphragm 21 cancel one another out, so that no oscillation energy is lost by transmission to the screw-in part 10 and to the container wall 9.

The diaphragm 21 in conjunction with the flexurally elastic rod-shaped supports 42 and 43 forms the spring system of the mechanical oscillatory system, which spring system acts as a return spring. The mass of the mechanical oscillatory system consists on the one hand of the mass of the oscillatory rods 22 and 23 and on the other hand of the mass of the surrounding medium entrained by the oscillatory rods in the oscillation movements. This entrained mass is increased by the paddles 26 situated transversely with respect to the oscillation direction. The natural resonance frequency of the mechanical oscillatory system depends on the one hand on the spring rate of the spring system, which can be assumed as constant, and on the other hand on the total mass, which is variable in dependence on the entrained mass. When the oscillatory rods 22, 23 with their paddles are in the air, the entrained mass of the air is negligible, and a natural resonance frequency is established which is determined substantially by the mass of the oscillatory rods. If on the other hand the oscillatory rods with their paddles penetrate into a filling, the entrained mass changes and thus the natural resonance frequency of the mechanical oscillatory system changes. The illustrated form of paddle gives the optimum effect, taking into account the width limitation imposed by the screw-in hole. It has been found that the increase in surface area obtained by further lengthening the paddles to beyond 60% of the oscillatory rod length no longer gives any substantial improvement as regards the frequency change.

The excitation of the oscillations of the mechanical oscillatory system is effected always with its natural resonance frequency, even when this changes. This is brought about by a conventional method in that the mechanical oscillation system itself serves as a frequency-determining element of an electrical oscillation generator. For this purpose the two electrodes 54 and 56 of the reception transducer are connected to the input of an amplifier to whose output terminals there are connected on the one hand the electrodes 58 and 62 and on the other hand the electrode 60 of the excitation transducer. Therefore, the frequency of the AC voltage applied to the excitation transducer always follows the natural resonance frequency of the mechanical oscillation system.

It has been found that, with the construction of the oscillatory rod system 20 and of the transducer arrangement 40 described here, even small changes in the entrained mass result in a marked change in the natural resonance frequency. This marked change in natural resonance frequency occurs even in the case of very small oscillation amplitudes at the oscillatory rods. Therefore, the oscillatory rod system is preferably operated with a very small oscillation amplitude, which remains substantially constant, and the arrangement, controlled in accordance with the output signal of the reception transducer, for initiating display and/or switching operations is so constructed that it responds to frequency changes. As a result, a number of considerable advantages are afforded:

1. To produce the very small oscillation amplitudes of the oscillatory rods a relatively small AC voltage is sufficient for actuation of the excitation transducer. It has been found that as compared with known devices of like order of magnitude which required an excitation voltage of 220 V, with the construction described an excitation voltage of 10 V is sufficient to obtain the same response sensitivity. The low excitation voltage is advantageous more particularly when used in explosion-endangered places.

2. The low excitation voltage and the small oscillation amplitude mean a small excitation power requirement, and this simplifies and reduces the cost of the construction of the electronic circuits.

3. Since even very small changes in the entrained mass suffice for obtaining a detectable frequency change, the device responds to very small changes in the density of the ambient medium. As a result it is possible to detect and monitor filling levels of filling materials of very small density, or transitions between fillings which have very small density differences. The response point can also be set very precisely. Thus for example it is possible to detect the transition between air and a foam, or between a foam and a liquid.

4. On the other hand it has been found that the changes in natural resonance frequency are substantially independent of the viscosity of the filling. This is due primarily to the sharpened form of the peripheral edges of the paddles 26. Independence from viscosity is a very desirable property since in the case of many fillings the viscosity of the filling can vary within wide limits, for example in dependence on temperature fluctuations; of course it cannot be allowed that the device should wrongly indicate a change in filling level when viscosity changes occur.

5. The small oscillation amplitudes with which the device described can be operated also afford the advantage that none of the components are subjected to much mechanical stress, and this simplifies and reduces the cost of the construction.

6. Finally, the evaluation of the frequency changes gives improved intrinsic safety with the device, since in every operating condition oscillations occur and these differ merely in respect of their frequency. Therefore if the oscillations cease this indicates failure of the device.

Figure 11:
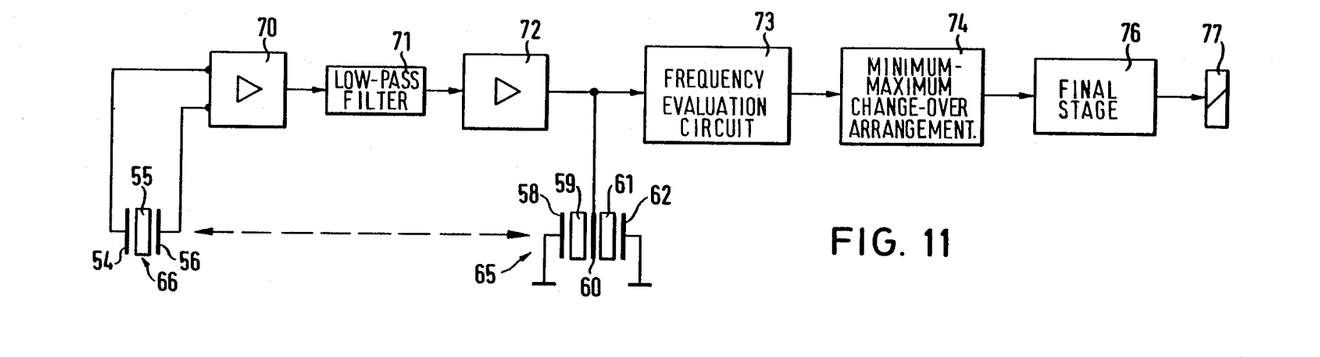
FIG. 11 shows a block diagram of the electronic circuit system of the device and FIG. 12 shows a block diagram of a form of embodiment of the frequency evaluation circuit.

FIG. 11 shows a block diagram of an example of embodiment of the electronic circuit system arranged in the electronics head 30. This diagram again shows the reception transducer 66 with the piezoelectric element 55 and the electrodes 54 and 56, and the excitation transducer 65 with the piezoelectric elements 59, 61 and the electrodes 58, 60 and 62.

The electrodes 54, 56 of the reception transducer 66 are connected to the two input terminals of an amplifier 70. Connected to the output of the amplifier 70 is a low-pass filter 71 whose pass range corresponds to the range of the fundamental frequencies of the oscillations of the mechanical oscillatory system, whereas it blocks harmonics of these fundamental frequencies. The low-pass filter 71 ensures that the oscillatory system can be excited only on a fundamental frequency, and prevents self-excitation in response to a harmonic.

The output of the low-pass filter 71 is connected to the input of a power amplifier 72, to the output of which the excitation transducer 65 is connected. Thus the power amplifier 72 delivers to the excitation transducer an AC voltage which has the same frequency as the output signal of the reception transducer. Since the excitation transducer is coupled with the reception transducer via the mechanical oscillatory system, the oscillatory system is excited always at the natural resonance frequency of the mechanical oscillatory system.

According to a preferred form of embodiment the power amplifier 72 is considerably over-driven into saturation. AC voltage which it delivers is almost rectangular in form. As a result, the excitation transducer is always actuated with the same voltage amplitude even when the oscillatory rods are considerably damped by a filling. Digital signal processing in the connected circuit assemblies is also facilitated.

Connected to the output of the power amplifier 72 is the input of a frequency evaluation circuit 73 which determines whether the frequency of the output AC voltage of the power amplifier 72 is above or below an adjustable reference frequency. The output signal of the frequency evaluation circuit 73 assumes one or other of two values depending on whether the output frequency of the power amplifier 72 is above or below the set reference frequency. As a result, an indication is given of whether the oscillatory rods are oscillating in air (or a filling of lower density) or in a filling of relatively considerable density.

The output of the frequency evaluation circuit 73 is connected to the input of a minimum-maximum change-over arrangement 74, which can be switched over either to minimum monitoring or to maximum monitoring. Depending on whether the oscillatory rod system is used for monitoring the minimum or the maximum filling level in a container, different conditions obtain in fact. When monitoring the maximum filling level, the oscillatory rod system normally oscillates in air and the critical state is reached when filling covers the oscillatory rod system. Therefore, in this case a switching operation or an indicating means must be actuated when the oscillation frequency falls below the preset reference frequency. In the case of minimum monitoring the oscillatory rod system normally oscillates in filling, and the critical state occurs when the oscillatory rods are no longer covered with filling and oscillate in air. Therefore, in this case a switching operation must be initiated or an indication means actuated when the oscillation frequency exceeds the preset reference frequency. The minimum-maximum change-over arrangement 74 is so constructed that it emits an output signal in accordance with its particular setting in the one or the other case.

The output signal of the minimum-maximum change-over arrangement 74 is fed, after amplification and stabilisation in a final stage 76, to a consumer 77 for example a relay or an indicating device.

Figure 12:
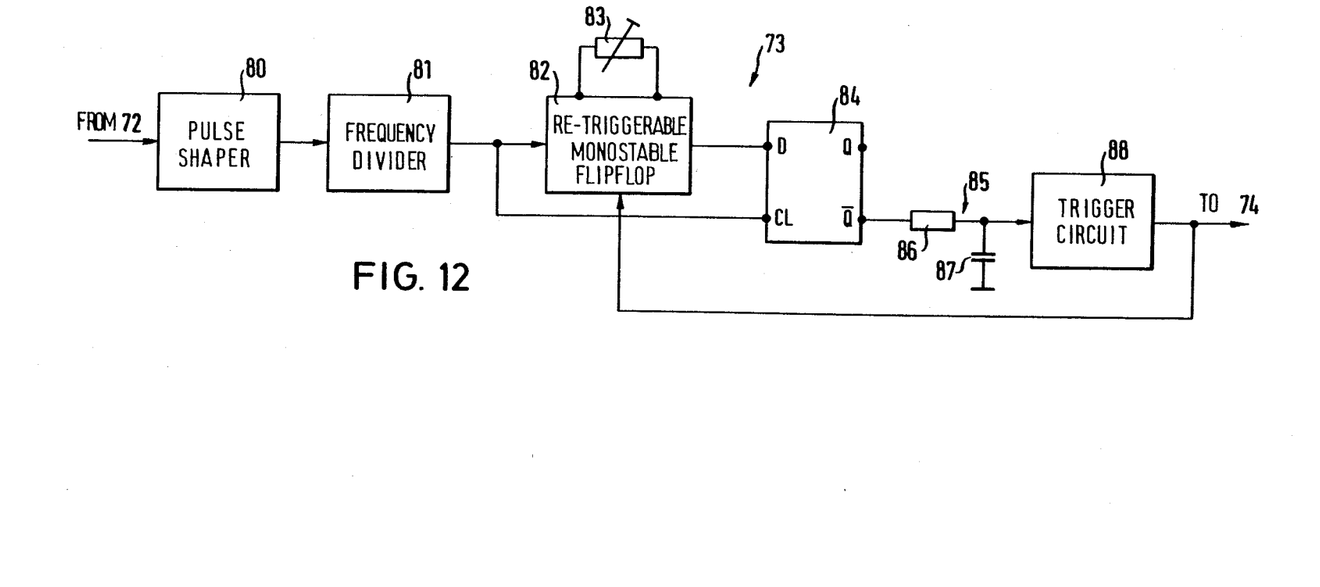

FIG. 12 shows the block diagram of a form of embodiment of the frequency evaluation circuit 73 in more detail.

The AC voltage coming from the output of the power amplifier 72 and possibly already almost rectangular in form is fed to a pulse shaper 80 to the output of which a frequency divider 81 with a divider ratio of 1:2 is connected. Thus at the output of the frequency divider 81 there is a clean rectangular-wave signal with the pulse duty factor 1:2, the frequency of which is equal to half of the oscillation frequency of the oscillatory rod system. This rectangular-wave signal is fed to the trigger input of a retriggerable monostable flipflop 82 the hold time of which is adjustable, as indicated symbolically by a variable resistor 83. The setting of the hold time of the monostable flipflop 82 defines the reference frequency.

The output of the retriggerable monostable flipflop 82 is connected to the D input of a D flipflop 84 which at its timing input CL receives the rectangular-wave pulses from the output of the frequency divider 81. As is known, a D flipflop accepts at a specific edge of each timing pulse applied to the timing input CL the signal value present at the D input at the same instant. Therefore, the D flipflop 84 forms a time comparison circuit which determines whether the repetition period of the rectangular-wave pulses emitted by the frequency divider 81 is above or below a value defined by the hold time set in the monostable flipflop 82. In fact if this repetition period is shorter than the preset hold time the monostable flipflop is retriggered by each rectangular-wave pulse emitted by the frequency divider 81 before said monostable flipflop has returned to the condition of rest. The output signal of the monostable flipflop 82 then remains permanently at the signal value "1". In this case at each timing pulse fed to the timing input CL of the D flipflop there is present at the D input the signal value "1", so that the flipflop 84 remains always in the set state (or "1" state), in which the signal value "0" is present at the output $\overline{Q}$.

If on the other hand the repetition period of the rectangular-wave pulses emitted by the frequency divider 81 is longer than the hold time of the retriggerable monostable flipflop 82, the monostable flipflop returns to the condition of rest before the arrival of the next trigger pulse. Since the same output pulse of the frequency divider 81 is also fed to the timing input CL of the flipflop 84, this timing pulse finds the signal value "0" at the D input, so that the flipflop 84 is returned to the reset state (or "0" state). Then the signal value "1" is present at output $\bar{Q}$, which indicates that the period of the rectangular-wave output signal of the frequency divider 81 is greater than the hold time set in the monostable flipflop 82, which is equivalent to saying that the oscillation frequency of the oscillatory rod system is below the preset reference frequency.

Connected to the output $\bar{Q}$ of the D flipflop 84 is a time delay circuit 85 which has the effect that the arrangements which follow do not respond at once to the first output signal of the D flipflop 84, but respond only when the frequency has been found to have been below the preset reference frequency for a specific minimum number of successive periods. This is intended to prevent triggering switching operations or displays as a result of sporadic disturbances. Such sporadic disturbances are caused for example by air bubbles or gas bubbles which form briefly around the oscillatory rods in gas-evolving liquids, or by air bubbles which are blown artificially into the container such as happens in many fields of use.

In the example of embodiment of FIG. 12 the response delay circuit 85 is formed of a R-C system having a resistor 86 and a capacitor 87. When a voltage with the signal value "1" appears at the output $\bar{Q}$, the capacitor 87 charges with the time constant of the R-C system to this voltage. A trigger circuit 88 connected to the output of the R-C system responds when the charge voltage of the capacitor 87 reaches a predetermined response threshold value, which may amount to for example $\frac{2}{3} U_B$ ($U_B$=current supply voltage), and it falls off again when the charge voltage of the capacitor 87 drops below a lower fall-off threshold value, which may amount to $\frac{1}{3} U_B$ for example. The time constant of the R-C system 85 is so chosen that the response threshold value is not reached until the voltage at the output $\bar{Q}$ has had the value "1" over the duration of several periods of the output voltage of the frequency divider 81. When the flipflop 84 returns to the set state before the charge voltage at the capacitor 87 has reached the response threshold value, the voltage at the output $\bar{Q}$ returns again to the value "0", and the capacitor 87 discharges again.

Moreover, in order to obtain a stable control behaviour the output of the trigger circuit 88 is connected to an input of the re-triggerable monostable flipflop 82. When the trigger circuit 88 is triggered so that it delivers an output voltage to the minimum-maximum change-over arrangement 74 which is connected to its output side, this output voltage also reaches the monostable flipflop 82, in which said voltage effects a shortening of the preset hold time. As a result, slight frequency fluctuations of the rectangular-wave signal which is emitted by the frequency divider 81 are prevented from alternately causing going below and going above the hold time set at the monostable flipflop 82 and thus resulting in the flipflop 84 switching to and fro permanently.

We claim:

1. A device for monitoring a predetermined filling level in a container, comprising a mechanical oscillatory structure having a diaphragm held at its edge region, two oscillatory rods secured to said diaphragm in a spaced relationship so as to project into said container, and a bridging member held at a spacing from said diaphragm at the side remote from said oscillatory rods by flexurally elastic rod-shaped supports each connected rigidly at one end to an oscillatory rod, further comprising an excitation arrangement for imparting to said oscillatory rods oscillations in opposite directions transversely to the longitudinal direction of said rods, said excitation arrangement having an excitation transducer with at least one piezoelectric element excitable by an AC voltage and a reception transducer with at least one piezoelectric element converting the oscillations of the mechanical oscillatory structure into an electrical output signal, the piezoelectric elements of said excitation transducer and of said reception transducer being arranged in a stack which is held, with preloading of said diaphragm, between said bridging member and the portion of said diaphragm which is situated between said oscillatory rods, and further comprising an evaluation circuit for initiating at least one of a display and switching operation in response to the output signal of said reception transducer.

2. The device according to claim 1 wherein said bridging member is substantially rigid.

3. The device according to claim 1 wherein the piezoelectric elements are arranged in the stack together with metal electrodes abutting on the piezoelectric elements and with insulating elements situated between the metal electrodes.

4. The device according to claim 3 wherein there is arranged in the stack at least one further metal electrode which does not abut on a piezoelectric element and which is connected to ground potential, as a screening means for the piezoelectric element of the reception transducer.

5. The device according to claim 4 wherein the piezoelectric element of the reception transducer with its metal electrodes abutting on its two sides, is arranged with interposition of insulating elements between a metal electrode of the excitation transducer connected to ground potential and a further metal electrode.

6. The device according to claim 3 wherein the excitation transducer comprises two piezoelectric elements which are connected in parallel electrically and arranged in series mechanically.

7. The device according to claim 3 wherein a metal plug is arranged at each end of the stack.

8. The device according to claim 3 wherein the transverse extent of that end face of the stack which abuts on the diaphragm, measured along the connecting line between the axes of the oscillatory rods, is substantially equal to the spacing between the ends of the oscillatory rods which are connected to the diaphragm.

9. The device according to claim 1 comprising means for adjusting the holding force on the stack which preloads the diaphragm.

10. The device according to claim 1 wherein the diaphragm forms the bottom portion of a screw-in part which is screwable into an aperture in the container wall, and that the oscillatory rods are so shaped and connected to the diaphragm that they have a greater inter-axes spacing at their free ends than at their ends connected to the diaphragm, but can still be inserted through the aperture in the container wall.

11. The device according to claim 10 wherein the oscillatory rods are provided with offset portions.

12. The device according to claim 10 wherein on each oscillatory rod there is arranged a paddle which extends transversely to the oscillation direction and the width of which transversely to the oscillatory rod axis is so dimensioned that the oscillatory rods with their paddles can be introduced through the aperture of the container wall and that each paddle extends in the longitudinal direction from the free end of the oscillatory rod over 40 to 60% of the length of the oscillatory rod.

13. The device according to claim 12 wherein the peripheral edge regions of the paddles are tapered to knife-like edges.

14. The device according to claim 1 wherein the reception transducer is connected to the input of an amplifier circuit to the output of which the excitation transducer is connected, so that the mechanical oscillatory structure is excited to oscillate at its natural resonance frequency, and that the evaluation circuit is connected to the output of the amplifier circuit and is so constructed that it initiates at least one of a display and switching operation when the frequency of the output signal of the amplifier circuit either exceeds or is below a preset reference frequency.

15. The device according to claim 14 wherein the amplifier circuit comprises a low-pass filter whose pass range corresponds to the range of the fundamental frequencies of the natural resonance oscillations of the mechanical oscillatory structure, so that self-excitation of oscillations in response to a harmonic is obviated.

16. The device according to claim 14 wherein the final stage of the amplifier circuit is over-driven into saturation.

17. The device according to claim 14 wherein the evaluation circuit comprises a response delay circuit which allows the initiation of at least one of a display and switching operation only when it has been found that the reference frequency has been exceeded or gone below during a predetermined number of periods.

18. The device according to claim 17 wherein the evaluation circuit comprises a signal converting circuit which transforms the output signal of the amplifier circuit into a rectangular-wave signal whose frequency is proportional to the output frequency of the amplifier circuit, and a time comparison circuit which is connected to the output of the signal converting circuit and which compares the period duration of the rectangular-wave signal with an adjustable reference time duration and emits a voltage if the period duration is either below or exceeds the reference time duration, that the response delay circuit comprises an integrating R-C system the capacitor of which is chargeable by the output voltage of the time comparison circuit through a resistor, and that there is connected to the output of the integrating R-C system a trigger circuit which is triggered when the charge voltage of the capacitor reaches a predetermined threshold value.

19. The device according to claim 18 wherein the time comparison circuit comprises a retriggerable monostable flipflop with adjustable hold time, to the trigger input of which there is applied the rectangular-wave signal produced by the signal converting circuit, also a D flipflop whose D input is connected to the output of the retriggerable monostable flipflop and whose timing input is connected to the output of the signal converting circuit and that the integrating R-C system is connected to an output of the D flipflop.

20. The device according to claim 19 wherein the output signal of the trigger circuit is fed to an input of the retriggerable monostable flipflop and brings about in the latter a modification of the preset hold time in the sense of increasing the control hysteresis.

* * * * *